US009840128B2

(12) United States Patent
Livingston et al.

(10) Patent No.: US 9,840,128 B2
(45) Date of Patent: Dec. 12, 2017

(54) VENT ADJUSTING SYSTEM

(71) Applicant: Ford Global Technologies, LLC, Dearborn, MI (US)

(72) Inventors: James Livingston, Lasalle (CA); Zachary David Nelson, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 14/643,144

(22) Filed: Mar. 10, 2015

(65) Prior Publication Data
US 2016/0263966 A1 Sep. 15, 2016

(51) Int. Cl.
*B60H 1/34* (2006.01)
*B60H 1/00* (2006.01)

(52) U.S. Cl.
CPC ..... *B60H 1/00964* (2013.01); *B60H 1/00871* (2013.01)

(58) Field of Classification Search
CPC ... B60H 1/34; B60H 1/00964; B60H 1/00871
See application file for complete search history.

(56) References Cited

U.S. PATENT DOCUMENTS

| 5,555,502 | A * | 9/1996 | Opel | B60H 1/00985 |
| | | | | 701/36 |
| 5,733,189 | A * | 3/1998 | Eastwood | B60H 1/3442 |
| | | | | 454/155 |
| 5,983,146 | A * | 11/1999 | Sarbach | B60H 1/00971 |
| | | | | 236/91 D |
| 6,347,987 | B1 * | 2/2002 | Ichishi | B60H 1/247 |
| | | | | 454/153 |
| 6,830,511 | B2 * | 12/2004 | Gehring | B60H 1/3421 |
| | | | | 454/152 |
| 7,056,203 | B2 * | 6/2006 | Shibata | B60H 1/3428 |
| | | | | 454/155 |
| 7,489,303 | B1 * | 2/2009 | Pryor | B60K 35/00 |
| | | | | 345/173 |
| 7,656,393 | B2 * | 2/2010 | King | G06F 1/1626 |
| | | | | 345/156 |
| 8,057,288 | B2 * | 11/2011 | Konet | B60H 1/3428 |
| | | | | 454/152 |
| 8,099,209 | B2 * | 1/2012 | Tschirhart | B60H 1/00985 |
| | | | | 701/36 |

(Continued)

FOREIGN PATENT DOCUMENTS

| DE | 10121909 A1 | 11/2002 |
| DE | 102011084439 A1 | 4/2013 |

(Continued)

*Primary Examiner* — Steven B McAllister
*Assistant Examiner* — Jonathan Cotov
(74) *Attorney, Agent, or Firm* — Frank MacKenzie; Brooks Kushman, P.C.

(57) ABSTRACT

A vehicle air vent system may include a vehicle air vent having an airflow mechanism configured to control the direction of airflow therefrom, a user interface positioned around a periphery of the vent; and a controller programmed to, based on a received touch point signal from the interface, instruct the mechanism to direct airflow from the vent in a direction corresponding to a location of the received touch point signal.

16 Claims, 3 Drawing Sheets

(56) References Cited

U.S. PATENT DOCUMENTS

| | | | | |
|---|---|---|---|---|
| 8,210,913 B2* | 7/2012 | De Marino | ........ | B60H 1/00742 |
| | | | | 454/152 |
| 8,610,674 B2* | 12/2013 | Pryor | ............... | B60K 35/00 |
| | | | | 178/18.01 |
| 9,037,990 B2* | 5/2015 | Fino | ............... | B60H 1/0065 |
| | | | | 178/18.06 |
| 9,193,375 B2* | 11/2015 | Schramm | ............... | B60K 35/00 |
| 2003/0070437 A1* | 4/2003 | Hafner | ............... | B60H 1/00985 |
| | | | | 62/127 |
| 2003/0076306 A1* | 4/2003 | Zadesky | ............... | G06F 1/1626 |
| | | | | 345/173 |
| 2006/0105698 A1* | 5/2006 | Butera | ............... | B60H 1/00742 |
| | | | | 454/256 |
| 2008/0003938 A1* | 1/2008 | Baruschke | ......... | B60H 1/00735 |
| | | | | 454/143 |
| 2009/0267921 A1* | 10/2009 | Pryor | ............... | B60K 35/00 |
| | | | | 345/177 |
| 2010/0327070 A1* | 12/2010 | Bouchard | ......... | B60H 1/00985 |
| | | | | 236/49.3 |
| 2015/0116200 A1* | 4/2015 | Kurosawa | ............... | B60K 35/00 |
| | | | | 345/156 |
| 2015/0328958 A1* | 11/2015 | Winget, Jr. | ........ | B60H 1/00742 |
| | | | | 454/155 |

FOREIGN PATENT DOCUMENTS

| | | | |
|---|---|---|---|
| JP | 2002362142 A | 12/2002 | |
| JP | 2014191780 A | 10/2014 | |
| KR | 20110008177 U | 8/2011 | |
| WO | 2014026854 A1 | 2/2014 | |

* cited by examiner

VENT ADJUSTING SYSTEM

TECHNICAL FIELD

This disclosure relates to a vent adjusting system.

BACKGROUND

Vehicles often include vents within the reach of a driver or passenger within the vehicle to deliver air to the cabin of the vehicle. Mechanisms within the vents may facilitate directing airflow in a desired direction based on user input. Oftentimes, vertical and horizontal slats are manually maneuvered to achieve the desired airflow direction.

SUMMARY

A vehicle air vent system may include a vehicle air vent having an airflow mechanism configured to control the direction of airflow therefrom, a user interface positioned around a periphery of the vent; and a controller programmed to, based on a received touch point signal from the interface, instruct the mechanism to direct airflow from the vent in a direction corresponding to a location of the received touch point signal.

A vehicle air vent system may include a vehicle air vent having an airflow mechanism configured to control direction of airflow and a fan configured to control airflow speed, a touch-sensitive user interface positioned around the vent and configured to receive a plurality of touch points indicative of desired airflow, and a controller programmed to, based on a received touch point signal, control the mechanism and the fan to achieve the desired airflow.

A vehicle air vent system may include a touch-sensitive user interface surrounding a vehicle air vent periphery and a controller programmed to control airflow from the vent in response to position of a detected touch on the user interface

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a vent adjusting system for an interior vehicle vent configured to deliver airflow to the interior cabin of a vehicle. The vent may include at least one manual adjustment point configured to adjust horizontal and vertical slats within the vent. A touch panel interface may surround the outer periphery of the vent and be configured to control the horizontal and vertical slats based on user interaction at the touch panel interface. That is, the horizontal and vertical slats may be adjusted in response to a user's touch at the touch panel interface. For example, if a user desires airflow in a specific direction, the user may touch the touch panel interface on the side at which the airflow is desired. If a user desires a leftmost airflow, the user may touch the left side of the touch panel interface. Additionally the amount or speed of airflow may also be dictated by the user's interaction with the panel interface. A circular movement around the panel interface may indicate a desired speed of the airflow. In one example, rapid movement around the touch panel may result in a fast or high airflow. On the contrary, a slower movement around the periphery of the touch panel may indicate slower or lower airflow. Based on the user interaction with the touch panel, a controller may control both a motor driving the horizontal and vertical slats, as well as a fan, blower, nozzle, cover, or other device controlling the speed of the airflow.

Figure 1:
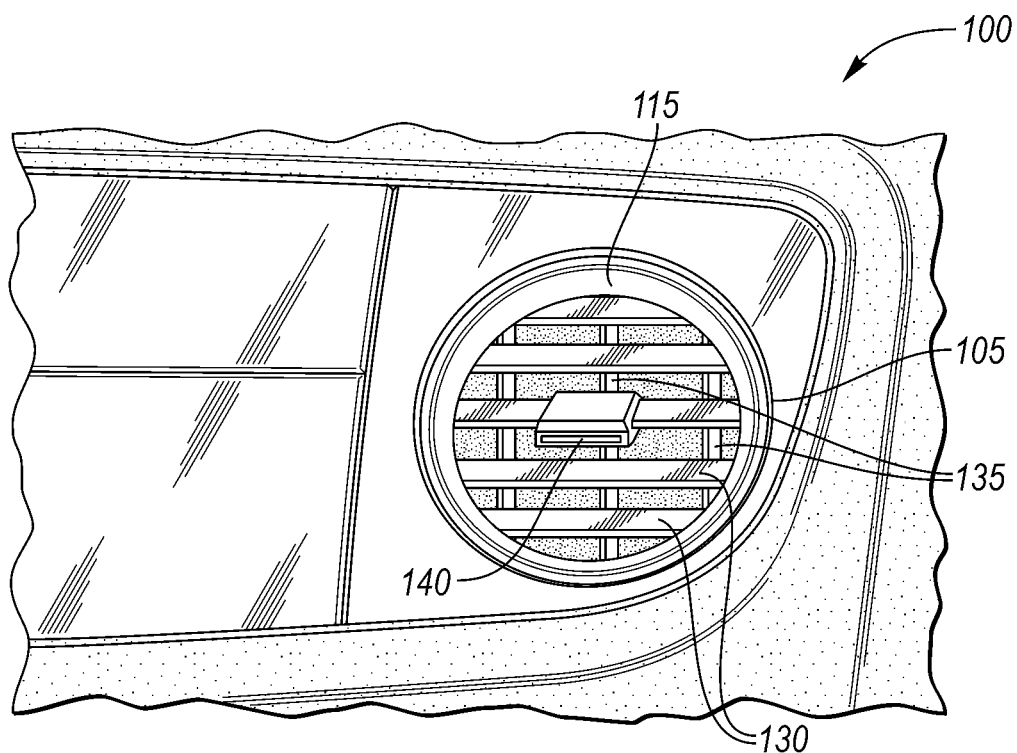
FIG. 1 illustrates a vent system.

FIG. 1 illustrates a vent system 100 having a vent 105 surrounded by a touch panel interface 115. The vent 105 may be an interior vehicle vent configured to deliver airflow to a vehicle cabin. The vent 105 may include at least one airflow direction mechanism such as horizontal slats 130 and vertical slats 135. The slats are configured to control the direction of airflow out of the vent. Although not shown in FIG. 1, slats 130, 135 may be controlled by a controller and a motor coupled thereto (see controller 150 and motor 155 in FIG. 2). A manual adjustment point 140 may be coupled to at least one of the horizontal slats 130 and at least one of the vertical slats 135. The manual adjustment point 140 may facilitate movement of the slats 130, 135 based on user interaction at the adjustment point 140. Thus, the manual adjustment point 140 may permit a user to manually adjust the direction of the airflow from the vent 105. During manual adjustment, the motor may be disengaged from the slats 130, 135. The motor may then reengage the slats 130, 135 after predefined amount of time has passed. Airflow may also be controlled by the controller and the motor in an auto mode based on other factors such as cabin temperature, user presets, and other automated settings.

Figure 4:
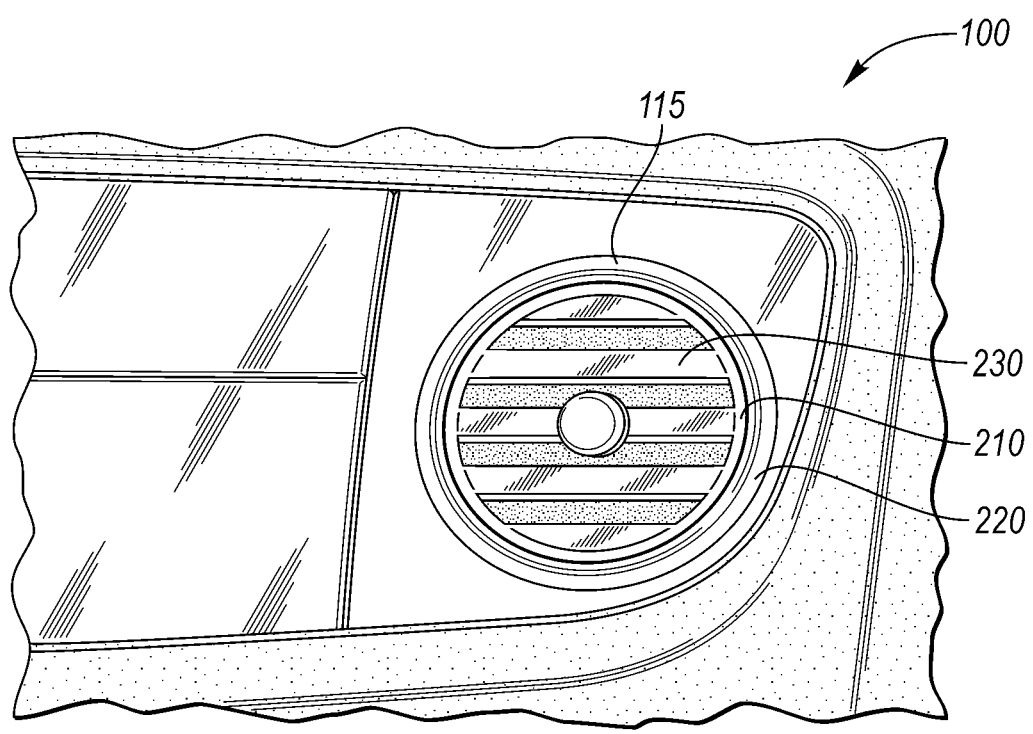
FIG. 4 illustrates another vent system.

While the airflow direction mechanism is shown here and by way of an example to include slats 130, 135, other mechanisms may also be used. For example, as shown in FIG. 4, the airflow direction mechanism may include a ball-joint vent 210. In this configuration, the vent may include fixed slats 230 retained within a round inner socket 210 that is movable within an outer casing 220. The motor may be configured to move the inner socket 210 to a specific rotational position based on user interaction. Instead of having slats 130, 135 that move, the inner socket 210 may move to achieve the desired airflow direction.

The touch panel interface 115 may be a user interface configured to detect multi-touch gestures from a user. The interface 115 may be a resistive touch screen panel configured to detect the position of a touch point within the interface 115. The interface 115 may also be a capacitive touch screen panel configured to detect a change in capacitance thus identifying a touch point within the interface 115. Other types of interfaces may also be used such as infrared grids, optical imaging, and acoustic pulse recognition, etc. The interface 115 may transmit the identified pressure point (or touch point) to the controller 150. The controller 150 may then send instructions to the motor driving the slats 130, 135. The instructions may include the desirable position of each slat 130, 135 based on the detected touch point. This feature is discussed in more detail with respect to FIG. 3 below.

The instructions may also include a desired fan speed and/or air temperature for the fan 165 corresponding to a desired airflow speed, as detected by a plurality of touch points at the interface 115. As explained, the desired speed may be indicated by the user based on a circular tracing motion at the interface 115. If the fan 165 is currently producing airflow, speed of the airflow may be adjusted via the circular tracing motion. For example a rapid movement around the interface 115 may indicate a desire for a higher airflow speed, while a slower movement around the interface 115 may indicate a desire for a lower airflow speed. Alternatively, tracing in a first direction, such as clockwise, may increase airflow while tracing in a second direction may decrease airflow either in combination with, or independent of, the rate of movement of the touch. Likewise airflow may be initiated or ceased in a similar manner. In this example a user may cease airflow by slowly moving his or her finger around the interface 115 until no air emits from the vent. The controller 150 may determine the desired airflow speed based on a delay between a first received touch point and subsequent touch points. A larger delay (e.g., a delay of 0.08 seconds) may indicate a slower airflow. A smaller delay be (e.g., a delay of 0.1 seconds) may indicate a faster.

The controller 150 may also determine the desired airflow speed based on the speed at which the user touch circles the interface 115. The speed may be calculated based on a time difference between two touch points. The speed may also be calculated based on the time the user takes to completely circle the interface 115. The controller 150 may determine a fan speed based on the desired airflow speed as indicated at the interface 115. The controller 150 may then transmit the fan speed in the instructions to the fan 165.

In another example, the controller 150 may also interpret interaction at the interface 115 similar to a volume control. For example, the further a user drags one's finger, the higher the desired airflow speed. Similarly, the shorter the 'drag', the slower the desired airflow speed. That is, the distance between a first interaction and a second interaction, may also be used to determine the desired airflow speed.

Figure 2:
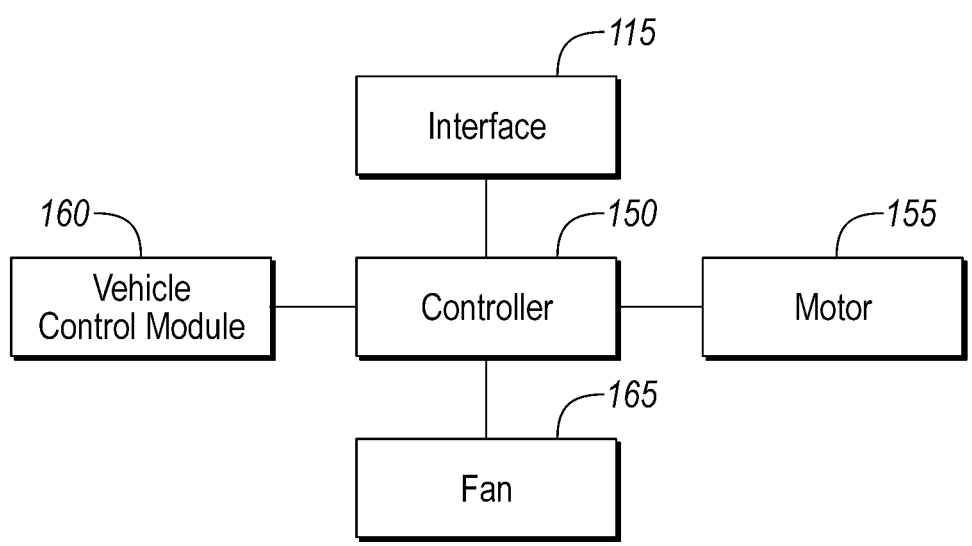
FIG. 2 illustrates a block diagram of the vent system.

FIG. 2 illustrates a block diagram of the vent system 100. The controller 150 may be coupled to the interface 115, motor 155, a vehicle control module 160, and a fan 165. The motor 155 may be used to drive the slats 130, 135. The fan 165 may be configured to produce a current of air through the vent 105. The speed of the air current may be controlled by the controller 150. The controller 150 may include a processor and a memory configured to carry out instructions thereon. Once a touch point is recognized at the interface 115, the interface 115 communicates the touch point to the controller 150 via touch point data. The controller 150 may then analyze the touch point data to determine an ideal placement of the slats 130, 135. For example, if the touch point is recognized at a left portion of the interface 115 (i.e. at approximately 9 o'clock on the round interface), then the ideal placement of the slats 130, 135 may include placement that would force the air out of the left side of the vent 105.

In another example and as explained above, a plurality of touch points may be recognized and included in the touch point data. This plurality of touch points may indicate a plurality of interaction points between the interface 115 and the user. This may be the case when the user wishes to control the rate of airflow delivered by the vent 105. The user may control the rate of airflow by moving a finger around the interface 115. In this example the user may make a full 360° circle by tracing a finger around the interface. The speed at which the user's finger is moved along the interface 115 may be used to control the desired airflow speed. The controller 150 may analyze the speed and transmit instructions to the fan 165 based on the desired airflow speed. That is, the fan 165 may receive instructions to speed up, slow down, initiate airflow, or cease airflow based on the touch point data.

Accordingly, both the direction of airflow and rate of airflow may be controlled by the touch panel interface 115.

In yet another example, the controller 150 may also use the touch point data to enable or disable other vehicle features (e.g., via the vehicle control module). In one example, the vehicle control module 160 may control various vehicle features such as a voice command feature and a gesture control feature, among others. The vehicle control module 160 may enable or disable such vehicle features (i.e., vehicle command systems) based on received user interaction at the interface 115. This user interaction may, for example, include double tapping the touch panel interface 115. Upon double tapping the interface 115, the voice command feature may be enabled, thus allowing the user to issue voice commands. In some examples the voice commands may be used to further control the airflow from the vent 105. Similarly, the gesture control feature may also be enabled. Such feature may permit user gestures such as the wave of a hand to control the airflow. In other examples voice commands may be used for other vehicle systems, such as a navigation system, stereo system etc.

During operation, interaction at the interface 115 may override any automatic airflow adjustments, also referred to herein as auto mode. For example, the vent system 100 may be programmed to apply certain preset vent settings. These presets may be specific to a certain user (e.g., based on user height preferences etc.). Other automatic airflow adjustments may be made based on the cabin temperature, exterior temperature, window conditions (e.g., defrost condition), etc. When a user touches the interface 115, these automatic adjustments may cease and the vent system may enter an override mode. Similarly, the vent system 100 may re-enter the auto mode in response to a lack of interaction at the interface 115. For example, if the user ceases to touch the interface 115 for a predetermined amount of time (e.g., five minutes), the vent system 100 may revert back to auto mode. Additionally or alternatively, voice and/or gesture commands may be used to return the vent system 100 back to auto mode.

Figure 3:
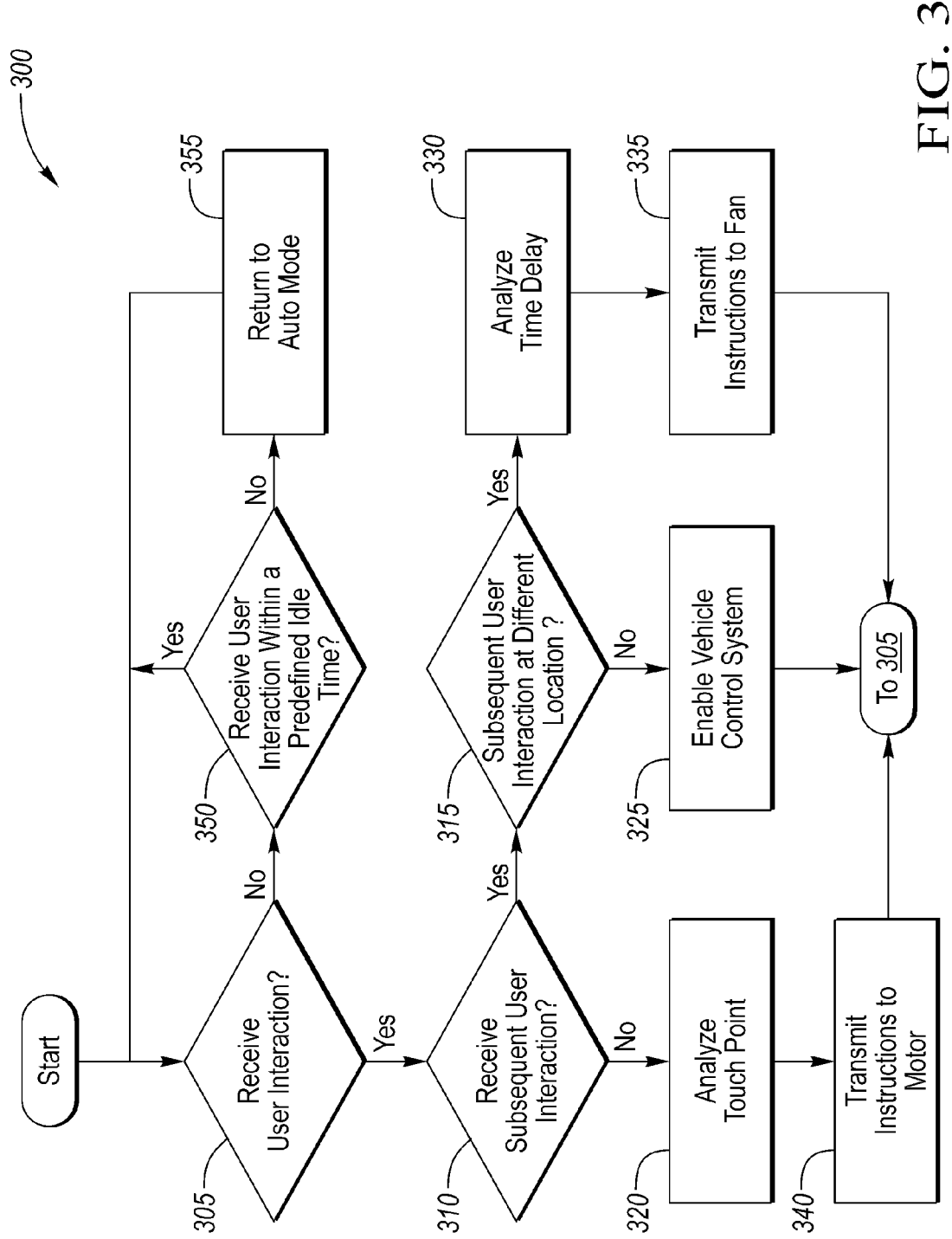
FIG. 3 illustrates a process for the vent system.

FIG. 3 illustrates a process 300 for the vent system 105. The process 300 begins at block 305, where the controller 150 determines whether user interaction (e.g., a touch point) is recognized at the interface 115. For example, user interaction may be recognized in response to the interface 115 detecting pressure from the user's finger. If user interaction is recognized, the process proceeds to block 310.

At block 310, the controller 150 determines whether a subsequent, or second, user interaction is recognized. Such subsequent user interaction may include another touch at the interface 115 (e.g., a double tap at user interface 115). The controller 150 may wait for a predetermined amount of time to determine whether a second interaction is recognized. For example, any subsequent interaction to that recognized in block 305 may be ignored unless it's received within the predefined amount of time (e.g., 0.5 second.) If the second user interaction is recognized, the process 300 may proceed to block 315. If no user interaction is recognized within the predefined amount of time of the first interaction recognized in block 305, the process proceeds to block 320.

At block 315, the controller 150 determines whether the second user interaction is at a substantially different location on the user interface 115 than that of the first user interaction. That is, the controller 150 determines whether the second user interaction would indicate that the user's finger has moved along the interface 115 instead of indicating a double tap. By determining that the second user interaction occurred at a different location on the interface 115 than that of the first user interaction, the controller 150 may determine that the touch points are moving along the interface 115 indicating that the user may desire a change in the speed of airflow. If the controller 150 determines that the first and second user interactions were received at substantially the same location on the interface 115 (i.e. recognizing a double tap), the process 300 proceeds to block 325. If not, the process 300 proceeds to block 330.

At block 325, the controller 150 may instruct the vehicle control module 162 to enable a vehicle feature such as the voice command feature and/or the gesture control feature. Users may wish to enable and disable vehicle features, such as the voice command and the gesture control features depending on their current driving state. For example when a user initially enters the vehicle cabin, attention may be directed to starting the vehicle, buckling the seatbelt, entering data into a navigation system, etc. During this time, the user may not be able to, or may not want to, control the vehicle vent 105 via voice commands or gestures. However, as the user or driver proceeds to drive the vehicle, the user then may wish to use such non-tactile commands to control airflow. Thus, such features may be enabled by a double tap at the interface 115. The process 300 may then return to block 305.

At block 330, the controller 150 may, in response to the controller 150 determining that the second user interaction was at a different location than the first user interaction, analyze the second user interaction as well as any subsequent user interactions. As described above, the controller 150 may determine a time delay between the first user interaction and the second user interaction. This time delay may indicate a desired speed of the airflow from the vent. For example if the user moves his or her finger around the interface 115 rapidly, the time delay between interactions may be short thus indicating a relatively high desired speed of airflow. To the contrary if the user moves his or her finger around the interface 115 slowly, the time delay between the interactions may be longer, thus indicating a relatively low desired airflow. The user may, via the interface 115, increase and decrease the speed of the airflow from the vent 105. While the example set forth herein explains a relationship between a first user interaction and a second user interaction, multiple user interactions may be analyzed to determine a desired speed of airflow. For example, a plurality of subsequent user interactions may be analyzed and a plurality of time delays may be determined. An average of those time delays may then be calculated and be used to determine the desired speed of the airflow.

At block 335, the controller 150 may transmit instructions to the fan 165. The instructions may include the desired fan speed as it relates to the desired speed of airflow. The process may then return to block 305.

At block 320, the controller 150 may analyze the position of the recognized user interaction at the user interface 115. That is, the controller 150 may recognize where the user tapped or touched the interface 115. The interface 115 may be continuous or include a plurality of discrete touch points. Once the controller 150 identifies the touch point, the controller 150 may also identify a desired airflow direction based on the touch point. For example, a user may touch the interface 115 at a leftmost point (e.g., approximately at a 9 o'clock position or a West position). The user may also touch the interface at any other position such as a topmost point (e.g., approximately at 12 o'clock position or a North position). The user may also touch the interface at any position in between, such as a North-West position, etc.

At block 340, the controller may transmit instructions to the motor 155 based on the analyzed touch point. The instructions may include a position or angle of the horizontal and vertical slats 130, 135. For example, in the example where the touch point was at a leftmost point of the interface 115, the instructions may specifically indicate that horizontal slats 130 are to be parallel with ground while the vertical slats 135 are to be angled toward the left side of the vent. Similarly in the example where the touch point was at a North West position, the instructions may specifically indicate that the horizontal slats 130 are to be angled upward while the vertical slats 135 are to be angled toward towards the left. Varying degrees of the angular offset of each of the horizontal and vertical slats 130, 135 may be achieved. The controller 150 may be configured to identify the desired angular offset of the slats 130, 135 based on the detected touch point. Thus, via interaction with the user interface 115, the user may indicate a desired airflow direction. The process may then return to block 305.

At block 350, the controller 150 may determine whether any user interaction has been recognized within a predefined idle time (e.g., 20 minutes). If no user interaction has been recognized (i.e., the user has not touched the interface 115) within the predefined idle time, the process 300 may proceed to block 355. Otherwise, the process 300 continues to wait for user interaction at block 305.

At block 355, the controller may instruct the vent system 100 to return to auto mode. That is, because the user is no longer interacting regularly with the user interface 115, the vent system 100 may resume normal auto mode activities, such as automatically heating and cooling the vehicle cabin based on predefined preferences, etc.

Accordingly, a vent system may be adjusted based on interactions with a user interface positioned around the periphery of the vent. In the representative embodiment illustrated, the user interface continuously surrounds the periphery of the vent. In other embodiments, the user interface may include discrete portions or sensors spaced around a portion or all of the periphery of the vent. The interface may permit a user to easily alter the airflow direction by touching the interface at a location that corresponds to the desired airflow direction. Furthermore, the user may easily adjust the airflow speed by interacting with the interface in a manner that indicates speed (e.g., quickly running one's finger around the interface).

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms or embodiments of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated.

What is claimed is:

1. A vehicle air vent system, comprising:
    a vehicle air vent having an airflow mechanism configured to control the direction of airflow therefrom;
    a user interface positioned around a periphery of the vent; and
    a controller programmed to, based on a received touch point signal from the interface, instruct the mechanism to direct airflow from the vent in a direction corresponding to a location of the received touch point signal, and to enable a voice command feature in response to recognizing a subsequent touch point signal being received within a predefined time of the received touch point signal.

2. The system of claim 1, further comprising a motor coupled to the controller and airflow mechanism and configured to drive the airflow mechanism to direct the airflow.

3. The system of claim 1, wherein the airflow mechanism includes horizontal and vertical slats to direct the airflow from the vent, the mechanism configured to position each of the horizontal and vertical slats to direct the airflow.

4. The system of claim 1, wherein the airflow mechanism includes a ball-joint vent having a rotatable socket and fixed slats, the mechanism configured to achieve a rotational position of the socket to produce a desired airflow.

5. The system of claim 1, further comprising a fan coupled to the controller and configured to control at least one of a temperature and speed of the airflow from the vent.

6. The system of claim 5, wherein the controller is further programmed to recognize at least one subsequent touch point signal and to instruct the fan to adjust the speed of the airflow based on a time difference between the received touch point signal and the subsequent touch point signal.

7. A vehicle air vent system, comprising:
    a vehicle air vent having a fan configured to control airflow speed;
    a touch-sensitive user interface positioned around the vent and configured to receive a plurality of touch points indicative of desired airflow; and
    a controller programmed to, based on a delay between at least two received touch points, control the fan to produce a desired airflow speed corresponding to the delay.

8. The system of claim 7, the vehicle air vent having an airflow mechanism configured to control direction of airflow, wherein the controller is programmed to instruct the mechanism to achieve a mechanism position to produce a desired airflow direction, the desired airflow direction corresponding to a location of at least one of the received touch points indicated by the received touch point signal.

9. The system of claim 8, wherein the airflow mechanism includes horizontal and vertical slats to direct the airflow from the vent, and the controller is programmed to instruct the mechanism to achieve a mechanism position including a position of each of the horizontal and vertical slats to produce the desired airflow.

10. The system of claim 9, further comprising a motor coupled to the controller and airflow mechanism and configured to drive the airflow mechanism to produce the desired airflow.

11. The system of claim 7, wherein the controller is programmed to recognize a first received touch point at a first location and to recognize a second received touch point at a second location distinct from the first location.

12. The system of claim 7, wherein the controller is further programmed to enable a vehicle command system in response to two touch points being received within a predefined time period.

13. The system of claim 12, wherein the vehicle command system includes at least one of a voice command feature and gesture control feature.

14. The system of claim 7, wherein the user interface continuously surrounds the vent periphery.

15. A vehicle air vent system, comprising:
    a touch-sensitive user interface surrounding a vehicle air vent periphery; and
    a controller programmed to, based on a delay between at least two received touch points at the user interface, control airflow from the vent to produce a desired airflow speed corresponding to the delay.

16. The system of claim 15, wherein the vent includes an airflow mechanism configured to control direction of the airflow.

* * * * *